United States Patent
Alvino et al.

(10) Patent No.: US 12,314,537 B2
(45) Date of Patent: May 27, 2025

(54) REGENERATING AN INTERACTIVE PAGE BASED ON CURRENT USER INTERACTION

(71) Applicant: NETFLIX, INC., Los Gatos, CA (US)

(72) Inventors: Christopher V. Alvino, Campbell, CA (US); Justin Basilico, Saratoga, CA (US); Chao-Yuan Wu, Austin, TX (US); Alexander J. Smola, Sunnyvale, CA (US)

(73) Assignee: NETFLIX, INC., Los Gatos, CA (US)

( * ) Notice: Subject to any disclaimer, the term of this patent is extended or adjusted under 35 U.S.C. 154(b) by 501 days.

(21) Appl. No.: 15/380,124

(22) Filed: Dec. 15, 2016

(65) Prior Publication Data

US 2018/0011615 A1 Jan. 11, 2018

Related U.S. Application Data

(60) Provisional application No. 62/360,038, filed on Jul. 8, 2016.

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/0485* (2013.01);
(Continued)

(58) Field of Classification Search
CPC .... G06F 3/0482; G06F 3/0483; G06F 3/0485; G06F 9/451; G06F 17/30828;
(Continued)

(56) References Cited

U.S. PATENT DOCUMENTS 6,154,767 A * 11/2000 Altschuler .......... G06F 16/9574
709/203
10,275,795 B1 * 4/2019 Karidi ................ G06Q 30/0254
(Continued)

FOREIGN PATENT DOCUMENTS

WO 2015/187409 A1 12/2015

OTHER PUBLICATIONS

D. Agarwal and B.-C. Chen. Regression-based latent factor models. In KDD, pp. 19-28. ACM, 2009.
(Continued)

*Primary Examiner* — Tuyetlien T Tran
(74) *Attorney, Agent, or Firm* — Artegis Law Group, LLP (57) ABSTRACT

In various embodiments, an optimization engine regenerates items included in an interactive page while the user is interacting with the interactive page. In operation, an optimization engine displays a portion of the interactive page during a viewing session. Subsequently, the optimization engine computes a probability distribution for the viewing session over a set of interests based on model parameters and operations performed by the user during the viewing session. The optimization engine then regenerates items that are included in a second portion of the interactive page based on the probability distribution for the viewing session. The optimization engine displays a least a part of the resulting regenerated interactive page. Advantageously, by regenerating items included in the interactive page based on operations performed by the user during the viewing session, the optimization engine reduces the time required for the user to view an item that piques an interest.

22 Claims, 4 Drawing Sheets

(51) Int. Cl.
| | |
|---|---|
| *G06F 3/0485* | (2022.01) |
| *G06F 9/451* | (2018.01) |
| *H04N 21/25* | (2011.01) |
| *H04N 21/258* | (2011.01) |
| *H04N 21/442* | (2011.01) |
| *H04N 21/466* | (2011.01) |
| *H04N 21/482* | (2011.01) |

(52) U.S. Cl.
CPC ........... *G06F 9/451* (2018.02); *H04N 21/251* (2013.01); *H04N 21/252* (2013.01); *H04N 21/25891* (2013.01); *H04N 21/44224* (2020.08); *H04N 21/466* (2013.01); *H04N 21/4661* (2013.01); *H04N 21/4667* (2013.01); *H04N 21/482* (2013.01); *H04N 21/4821* (2013.01); *H04N 21/4825* (2013.01)

(58) Field of Classification Search
CPC .. G06F 16/735; H04N 21/466; H04N 21/251; H04N 21/252; H04N 21/25891; H04N 21/4661; H04N 21/4667; H04N 21/482; H04N 21/4821; H04N 21/4825; G06N 3/08–088; G06N 20/00–20; G06N 3/00–126; G06N 5/00–048; G06N 7/00–08
See application file for complete search history.

(56) References Cited

U.S. PATENT DOCUMENTS

| | | | | |
|---|---|---|---|---|
| 2003/0051240 | A1* | 3/2003 | Schaffer | H04N 7/17318 725/34 |
| 2003/0212851 | A1* | 11/2003 | Drescher | G06K 9/6296 711/100 |
| 2009/0150814 | A1* | 6/2009 | Eyer | G06F 3/04842 715/765 |
| 2010/0100416 | A1* | 4/2010 | Herbrich | G06Q 30/0633 705/7.32 |
| 2010/0313141 | A1* | 12/2010 | Yu | G06Q 30/02 715/747 |
| 2011/0010669 | A1* | 1/2011 | Basu | G06Q 10/107 715/825 |
| 2011/0302158 | A1* | 12/2011 | Sanders | G06F 17/30867 707/723 |
| 2011/0314039 | A1* | 12/2011 | Zheleva | G06F 16/437 703/2 |
| 2012/0260214 | A1* | 10/2012 | Krishnamurthy | G06Q 30/0251 715/811 |
| 2013/0174045 | A1* | 7/2013 | Sarukkai | G06Q 30/0255 715/744 |
| 2013/0198641 | A1* | 8/2013 | Brownlow | G06F 3/0485 715/738 |
| 2014/0208268 | A1* | 7/2014 | Jimenez | H04N 21/47202 715/811 |
| 2015/0363500 | A1* | 12/2015 | Bhamidipati | G06F 17/30 707/722 |
| 2016/0098348 | A1* | 4/2016 | Burton | G06F 12/0215 711/137 |
| 2016/0147845 | A1* | 5/2016 | Gilbert | G06F 3/0482 707/723 |
| 2017/0161631 | A1* | 6/2017 | Rogers | G06Q 30/0282 |
| 2017/0188102 | A1* | 6/2017 | Zhang | G06F 16/00 |
| 2017/0251258 | A1* | 8/2017 | Swaminathan | H04N 21/4532 |

OTHER PUBLICATIONS

D. Agarwal and B.-C. Chen. FLDA: matrix factorization through latent Dirichlet allocation. In WSDM, pp. 91-100. ACM, 2010.
D. Agarwal, B.-C. Chen and P. Elango. Spatio-temporal models for estimating click-through rate. In WWW, pp. 21-30. ACM, 2009.
D. Agarwal, B.-C. Chen, P. Elango, N. Motgi, S.-T. Park, R. Ramakrishnan, S. Roy, and J. Zachariah. Online models for content optimization. In NIPS, pp. 17-24, 2009.
A. Ahmed, C.-H. Teo, S.V.N. Vishwanathan, and A. J. Smola. Fair and balanced: Learning to present news stories. In WSDM, pp. 333-342, 2012. ACM.
C. Alvino and J. Basilico. Netflix tech blog: Learning a personalized homepage. http://techblog.netflix.com/ 2015/04/learning-personalized-homepage.html.
P. Boldi, F. Bonchi, C. Castillo, D. Donato, A. Gionis, and S. Vigna. The query-flow graph: model and applications. In CIKM, pp. 609-618. ACM, 2008.
A. Das, M. Datar, A. Garg, and S. Rajaram. Google news personalization: scalable online collaborative filtering. In WWW, pp. 271-280. ACM, 2007.
Q. Diao, M. Qiu, C.-Y. Wu, A.J. Smola, J. Jiang, and C. Wang. Jointly modeling aspects, ratings and sentiments for movie recommendation (JMARS). In KDD, pp. 193-202. ACM, 2014.
K. El-Arini, G. Veda, D. Shahaf, and C. Guestrin. Turning down the noise in the blogosphere. In KDD, pp. 289-298. ACM, 2009.
F. Guo, C. Liu, A. Kannan, T. Minka, M. Taylor, Y.-M. Wang, and C. Faloutsos. Click chain model in web search. In WWW, pp. 11-20. ACM, 2009.
Q. Guo and E. Agichtein. Beyond dwell time: estimating document relevance from cursor movements and other post-click searcher behavior. In WWW, pp. 569-578. ACM, 2012.
Qi Guo, H. Jin, D. Lagun, S. Yuan, and E. Agichtein. Mining touch interaction data on mobile devices to predict web search result relevance. In SIGIR, pp. 153-162. ACM, 2013.
J. Huang, R. White, and G. Buscher. User see, user point: gaze and cursor alignment in web search. In SIGCHI, pp. 1341-1350. ACM, 2012.
J. Huang, R. White, and S. Dumais. No clicks, no problem: using cursor movements to understand and improve search. In SIGCHI, pp. 1225-1234, 2011.
J.Y. Kim, M. Cramer, J. Teevan, and D. Lagun. Understanding how people interact with web search results that change in real-time using implicit feedback. In CIKM, pp. 2321-2326. ACM, 2013.
J.A. Konstan and J. Riedl. Recommender systems: from algorithms to user experience. User Model. User-Adapt. Interact., 22(1-2):101-123, 2012.
D. Lagun, M. Ageev, Q. Guo, and E. Agichtein. Discovering common motifs in cursor movement data for improving web search. WSDM, p. 183-192, 2014.
H. Lieberman and T. Selker. Out of context: Computer systems that adapt to, and learn from, context. IBM Systems Journal, 39:617-632, 2000.
S. Rendle. Factorization machines. In ICDM, pp. 995-1000. IEEE, 2010.
3. Rendle. Factorization Machines with libFM. Trans. Intell. Syst. Technol., 3(3), pp. 57:1-22. ACM, 2012.
K. Rodden, X. Fu, A. Aula, and I. Spiro. Eye-mouse coordination patterns on web search results pages. In CHI, pp. 2997-3002. ACM, 2008.
R. Salakhutdinov and A. Mnih. Bayesian probabilistic matrix factorization using markov chain monte carlo. In ICML, pp. 880-887. ACM, 2008.
J. Teevan, E. Adar, R. Jones, and M.A. Potts. Information re-retrieval: repeat queries in yahoo's logs. In SIGIR, pp. 151-158. ACM, 2007.
R.W. White and G. Buscher. Text selections as implicit relevance feedback. In SIGIR, pp. 1151-1152. ACM, 2012.
Amatriain, X., "Big & Personal: data and models behind Netflix recommendations", Proceedings of the 2nd International Workshop on Big Data, Streams and Heterogeneous Source Mining: Algorithms, Systems, Programming Models and Applications, BigMine '13, Chicago, Illinois, Sep. 9, 2013, pp. 1-6, XP055414878, retrieved from URL: http://delivery.acm.org/10.1145/2510000/2501222/pl-amatriain.pdf.
Alvino, C. et al., "Learning a Personalized Homepage", Netflix, Netflix TechBlog, Apr. 9, 2015, pp. 1-15, XP055414212, retrieved from URL: https://medium.com/netflix-techblog/learning-a-personalized-homepage-aa8ec670359a.

(56) References Cited

OTHER PUBLICATIONS

Hopfgartner, F., et al. "On User Modelling for Personalized News Video Recommendation", Jun. 22, 2009, Network and Parallel Computing; [Lecture Notes in Computer Science; Lect. Notes Computer], Springer International Publishing, Cham, pp. 403-408, XP047437838.

Aghdam, M. H. et al., "Adapting Recommendations to Contextual Changes Using Hierarchical Hidden Markov Models" Recommender Systems, ACM, 2 Penn Plaza, Suite 701, New York, NY, 10121-0701, USA, Sep. 16, 2015, pp. 241-244, XP058073544.

International Search Report for Application No. PCT/US2017/040921 dated Oct. 20, 2017.

\* cited by examiner

Interactive Page 190(1)

| Goofy Comedy A | Goofy Comedy B | Goofy Comedy C | Goofy Comedy D | Goofy Comedy E | Goofy Comedy F |
|---|---|---|---|---|---|
| Action A | Action B | Action C | Action D | Action E | Action F |
| Horror A | Horror B | Horror C | Horror D | Horror E | Horror F |
| Feel-Good A | Feel-Good B | Feel-Good C | Feel-Good D | Feel-Good E | Feel-Good F |
| Documentary A | Documentary B | Documentary C | Documentary D | Documentary E | Documentary F |
| Foreign Comedy A | Foreign Comedy B | Foreign Comedy C | Foreign Comedy D | Foreign Comedy E | Foreign Comedy F |

Horizontal Scrolls 310

Visible Portion 280

Downward Scroll 320

Interactive Page 190(2)

| Goofy Comedy A | Goofy Comedy B | Goofy Comedy C | Goofy Comedy D | Goofy Comedy E | Goofy Comedy F |
|---|---|---|---|---|---|
| Action A | Action B | Action C | Action D | Action E | Action F |
| Foreign Comedy A | Foreign Comedy B | Foreign Comedy C | Foreign Comedy D | Foreign Comedy E | Foreign Comedy F |
| Feel-Good A | Feel-Good B | Feel-Good C | Feel-Good D | Feel-Good E | Feel-Good F |
| Documentary A | Documentary B | Documentary C | Documentary D | Documentary E | Documentary F |
| Horror A | Horror B | Horror C | Horror D | Horror E | Horror F |

Visible Portion 280

Regeneration Operations 330

REGENERATING AN INTERACTIVE PAGE BASED ON CURRENT USER INTERACTION

CROSS-REFERENCE TO RELATED APPLICATIONS

This application claims the priority benefit of the U.S. Provisional Patent Application having Ser. No. 62/360,038 and filed on Jul. 8, 2016. The subject matter of this related application is hereby incorporated herein by reference.

BACKGROUND OF THE INVENTION

Field of the Invention

Embodiments of the present invention relate generally to computer science and, more specifically, to regenerating an interactive page based on current user interaction.

Description of the Related Art

Attracting user interest in video assets is an important aspect of many video asset distribution systems. Accordingly, a graphical user interface (GUI) included in a video asset distribution system typically organizes and displays information about available video assets via a user-friendly, interactive page. For instance, an interactive page could map different genres of video assets to different rows of video assets displayed in the interactive page. The interactive page could include an "action" row that provides information about video assets that include action scenes, a "comedy" row that provides information about video assets that are considered to be funny or include funny scenes, and so forth. However, irrespective of the organization of the interactive page, oftentimes only a portion of the interactive page that is commensurate with the current display window is visible at any given time.

To allow the user to view information about all the available video assets, the GUI typically enables the user to perform navigation operations within the interactive page. For example, the GUI could enable the user to scroll horizontally along a displayed row to view additional video assets that are associated with a particular genre or vertically down the interactive page to view additional video assets that are associated with genres that have not yet been displayed. Further, the GUI also enables the user to select a video asset for playback within the interactive page. For example, the GUI could enable the user to click on a video asset to initiate the playback of the video asset or to view a preview of the video asset. Typically, if the user is able to quickly identify a video asset that piques an interest, then the user selects that particular video asset for playback. However, if the user does not find a video asset of interest, then the user typically does not select any of the displayed video assets for playback.

To increase the likelihood that a given user selects a video asset for playback during a given viewing session, a video asset distribution system may include an optimization engine that implements a recommendation algorithm that determines which video assets are most likely of interest to that given user. As referred to herein, a viewing session begins when a user executes the GUI that displays the interactive page and ends when the user terminates the GUI. When a user begins a viewing session, the optimization engine attempts to determine the general interests of the user based on historical viewing session data, user data, and the like. The optimization engine then generates the rows of video assets within the interactive page based on the general interests of the user. For example, suppose that the historical viewing session data indicated that the user scrolled through a previously displayed interactive page and selected video assets for playback from "horror", "war", and "science fiction" genres. In the current viewing session, the optimization engine would generate an interactive page that includes a "horror" row closer to the top of the interactive page than an "action" row that is, in turn, closer to the top of the interactive page than a "romance" row.

However, while the optimization engine may generate an interactive page that reflects the general interests of the user based on past viewing sessions, the interactive page does not account for the specific interests of the user that may exist during the current viewing session. For instance, the general interests of the user may not reflect the current mood of the user, whether the user is watching the video asset with a particular group of people, and so forth. If the interactive page generated for the current viewing session does not reflect these viewing session-specific interests of the user, then the recommendations and ordering of the video assets within the interactive page during the current viewing session may not increase, and may even decrease, the likelihood that the user selects one of the displayed video assets for playback. When the video assets displayed within the interactive page are not of interest to the user, then the quality of the overall viewing experience for the user is substantially diminished.

For example, suppose that the general interests of the user are action and special effects, but the viewing session-specific interests of the user are dating and frivolity. In such a situation, a conventional optimization engine would include "action" and maybe "horror" rows near the top of the interactive page and would include "romance" and "comedy" rows towards the bottom of the interactive page or may not include "romance" or "comedy" rows at all. Consequently, the user would not be able to quickly identify any video assets of interest within the interactive page, which would frustrate the user and substantially reduce the quality of the user's viewing experience.

As the foregoing illustrates, what is needed in the art are more effective techniques for generating the interactive page during current viewing sessions.

SUMMARY OF THE INVENTION

One embodiment of the present invention sets forth a computer-implemented method for generating an interactive page during a viewing session. The method includes displaying a first portion of an interactive page to initiate a viewing session, where the first portion of the interactive page includes a first set of items; computing a probability distribution for the viewing session over a set of interests based on one or more model parameters and one or more operations performed by a first user within the interactive page during the viewing session; regenerating a second portion of the interactive page based on the probability distribution for the viewing session and the one or more model parameters, where the second portion of the interactive page includes a second set of items that were not included in the first portion of the interactive page; and displaying at least a part of the second portion of the interactive page.

One advantage of the disclosed techniques is that regenerating the interactive page based on user operations within the interactive page during the viewing session results in an interactive page that is tailored to not only the user, but also to the viewing session-specific interests of the user. Consequently, unlike conventional interactive pages that remain unchanged throughout a viewing session, the likelihood that the user is able to quickly identify any items of interest within the interactive page is improved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
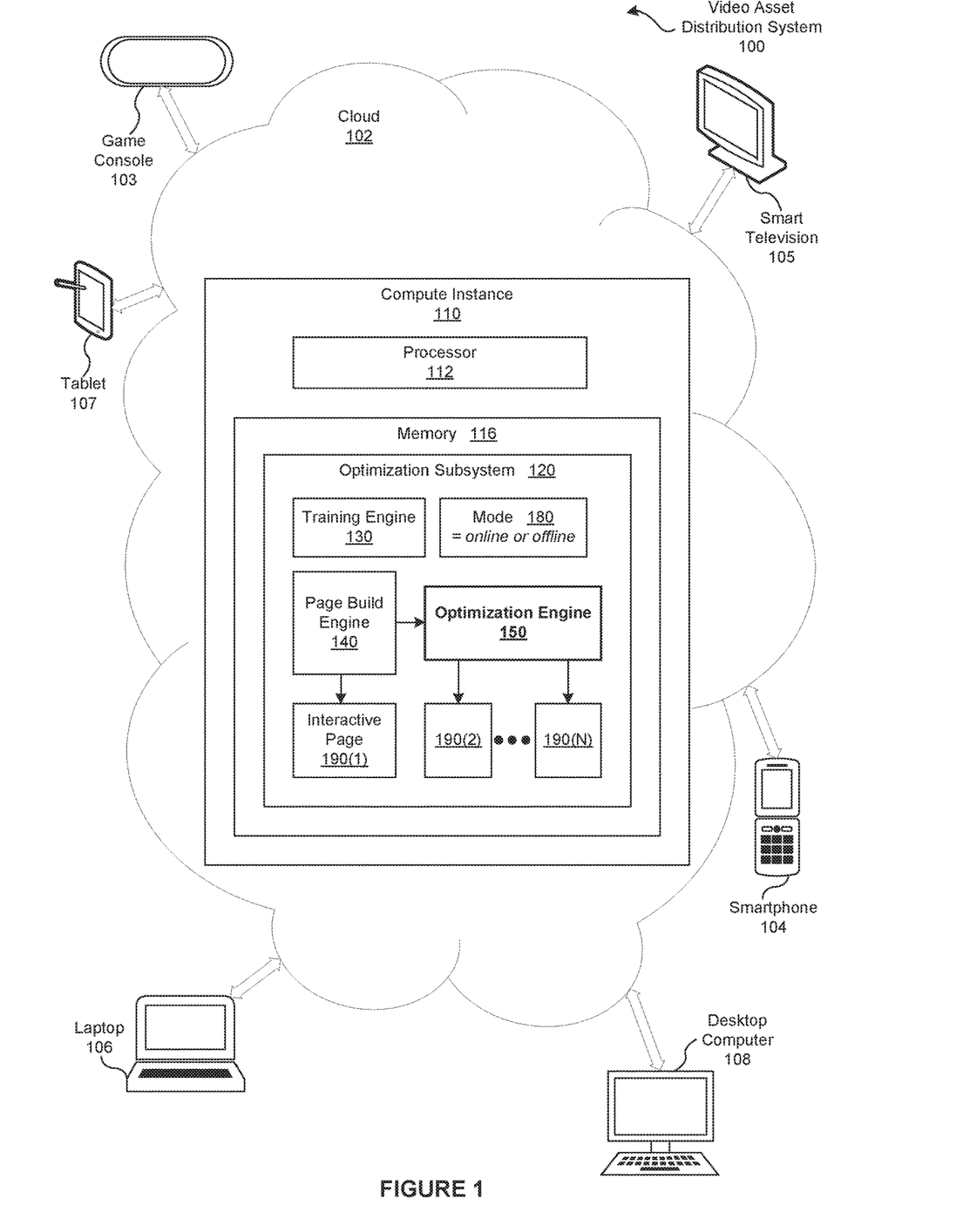
FIG. 1 is a conceptual illustration of a video asset distribution system configured to implement one or more aspects of the present invention.

FIG. 1 is a conceptual illustration of a video asset distribution system 100 configured to implement one or more aspects of the present invention. As shown, the video asset distribution system 100 includes a cloud (i.e., encapsulated shared resources, software, data, etc.) 102 connected to a variety of consumer devices capable of transmitting user data and/or displaying video assets. The consumer devices include, without limitation, a game console 103, a smartphone 104, a smart television 105, a laptop 106, a tablet 107, and a desktop computer 108. In alternate embodiments, the video asset distribution system 100 may include any number and/or type of consumer devices in any combination.

As used herein, a video asset refers to any item that includes video content. Video assets may also include additional content, such as audio content, and may be manipulated (e.g., stored, encoded, compressed, transmitted, etc.) using any mechanisms known in the art. For example, one video asset may be a movie that is stored as a compressed audio-video file, transmitted via the internet, and then decompressed for display purposes.

In some embodiments, one or more of the consumer devices are capable of running a web-browser configured to display a graphical user interface that enables the user to interact with the video assets and/or view information associated with the video assets. The implementation of the graphical user interface may differ based on the consumer device. For example, the laptop 110 could be configured to present the graphical user interface via a web-browser to enable users to browse video assets, select video assets, download video assets, and/or playback video assets.

The cloud 102 includes, without limitation, any number and type of compute instances 110. The cloud 102 receives input user data from a consumer device (e.g., the laptop 106), one or more computer instances 110 operate on the input user data, and the cloud 102 transmits processed information to the user. The cloud 102 conveys output information to the user via display capabilities of any number of consumer devices, such as a conventional cathode ray tube, liquid crystal display, light-emitting diode, or the like.

In other embodiments, the video asset distribution system 100 may include any distributed computer system instead of the cloud 102. In yet other embodiments, the video asset distribution system 100 does not include the cloud 102 and, instead, the video asset distribution system 100 includes a single computing unit that implements multiple processing units (e.g., central processing units and/or graphical processing units in any combination).

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the cloud 102 are configured to implement one or more applications. More specifically, the computer instances 110 implement applications that deliver video services associated with the video assets to the consumer devices over a network. For instance, in some embodiments, the computer instances 110 implement applications that deliver both video and audio streams associated with the video assets over the Internet to the smart television 105.

In operation, to attract user interest in available video assets, a graphical user interface (GUI) organizes and displays information about the video assets in a user-friendly fashion via an interactive page 190. For instance, the interactive page 190 could map different genres of video assets to different rows of video assets displayed in the interactive page 190. The interactive page 190 could include an "action" row that provides information about video assets that include action scenes, a "comedy" row that provides information about video assets that are considered to be funny or include funny scenes, and so forth. However, irrespective of the organization of the interactive page 190, oftentimes only a portion of the interactive page 190 that is commensurate with the current display window is visible at any given time.

To allow the user to view information about all the available video assets, the GUI typically enables the user to perform navigation operations within the interactive page 190. For example, the GUI could enable the user to scroll horizontally along a displayed row to view additional video assets that are associated with a particular genre or vertically down the interactive page to view additional video assets that are associated with genres that have not yet been displayed. Further, the GUI also enables the user to select a video asset for playback within the interactive page 190. For example, the GUI could enable the user to click on a video asset to initiate the playback of the video asset or to view a preview of the video asset. Typically, if the user is able to quickly identify a video asset that piques an interest, then the user selects that particular video asset for playback. However, if the user does not find a video asset of interest, then the user typically does not select any of the displayed video assets for playback.

To increase the likelihood that a given user selects a video asset for playback during a given viewing session, a conventional video asset distribution system may include a conventional optimization engine that implements a recommendation algorithm that determines which video assets are most likely of interest to that given user. As referred to herein, a viewing session begins when a user executes the GUI that displays the interactive page and ends when the user terminates the GUI. When a user begins a viewing session, the conventional optimization engine attempts to determine the general interests of the user based on historical viewing session data, user data, and the like. The conventional optimization engine then generates the rows of video assets within the interactive page based on the general interests of the user. For example, suppose that the historical viewing session data indicated that the user scrolled through a previously displayed interactive page and selected video assets for playback from "horror", "war", and "science fiction" genres. In the current viewing session, the conventional optimization engine would generate an interactive page that includes a "horror" row closer to the top of the interactive page than an "action" row that is, in turn, closer to the top of the interactive page than a "romance" row.

However, while the conventional optimization engine may generate an interactive page that reflects the general interests of the user based on past viewing sessions, the interactive page does not account for the specific interests of the user that may exist during the current viewing session. For instance, the general interests of the user may not reflect the current mood of the user, whether the user is watching the video asset with a particular group of people, and so forth. As a general matter, many users have diverse interests that change over time. For example, a user could form a new interest. Consequently, determining the current interests of a given user is difficult.

If the interactive page generated for the current viewing session does not reflect these viewing session-specific interests of the user, then the recommendations and ordering of the video assets within the interactive page during the current viewing session may not increase, and may even decrease, the likelihood that the user selects one of the displayed video assets for playback. When the video assets displayed within the interactive page are not of interest to the user, then the quality of the overall viewing experience for the user is substantially diminished.

For example, suppose that the general interests of the user are action and special effects, but the viewing session-specific interests of the user are dating and frivolity. In such a situation, a conventional optimization engine would include "action" and maybe "horror" rows near the top of the interactive page and would include "romance" and "comedy" rows towards the bottom of the interactive page or may not include "romance" or "comedy" rows at all. Consequently, the user would not be able to quickly identify any video assets of interest within the interactive page, which would frustrate the user and substantially reduce the quality of the user's viewing experience.

Another limitation of a conventional optimization engine is that the conventional optimization engine typically personalizes the interactive page based on information regarding the general interests of the user. However, suppose that a new user begins a first viewing session. In such a scenario, the conventional optimization engine would have no information regarding the general interests of the new user. Consequently, the conventional optimization engine would be unlikely to generate an interactive page that enables the new user to quickly identify video assets of interest within the interactive page.

Generating a Probabilistic Graphical User Model

To increase the likelihood that the user selects a video asset for playback during a viewing session, one or more of the compute instances 110 in the cloud 102 implement an optimization subsystem 120. The optimization subsystem 120 includes software applications that generally resides with the memory 116 and are executed by the processor 112. The page optimization subsystem 120 is configured to regenerate rows in the interactive page 190 based on a probabilistic graphical user model and user interactions detected during the current viewing session. The probabilistic graphical user model for the user is also referred to herein as "the model," and the model maps user data (e.g., user interactions, preferences, etc.) to page playback likelihoods for rows. In alternate embodiments, the model parameters may map any amount and type of data to selection likelihoods at any granularity. For example, in some embodiments, the model may map user data to playback likelihoods for individual video assets.

The user data may include any amount and type of information that provides insight into the preferences and interests of the user. Examples of user data include interaction data, explicit preferences specified by the user, and implicit preferences based on ratings specified by the user, to name a few. The interaction data may include any type of operations executed by the user during any number of viewing sessions. For example, the interaction data could include information about horizontal scrolling operations along rolls, vertical scrolling operations, clicking operations to select video assets for playback, and so forth. The interaction data may also include information about operations that are not executed by the user. For example, the interaction data could indicate that the user ignored all of the rows included in the first visible portion of the interactive page 190 during the last viewing session that the user initiated. Notably, the interaction data may include information associated with operations that are executed or not executed by the user during the current viewing session in addition to previous, historical viewing sessions.

As shown, the optimization subsystem 120 includes, without limitation, a mode 180, a training engine 130, an page build engine 140, and an optimization engine 150. In alternate embodiments, the optimization subsystem 120 includes any number of software applications (including one) that may be distributed across any number of the compute instances 110. When the mode 180 is equal to "offline," the training engine 130 performs machine learning operations that generate generate the model parameters based on training data (not shown in FIG. 1). The training data may include any amount and type of user data that provides insight into the historical video asset preferences and interests of any number of users over any number of viewing sessions.

When the mode 180 is equal to "online" and the user initiates a new viewing session, the optimization subsystem 120 generates the interactive page 190 based on the model parameters and the user data that is associated with the user. As the user interacts with the interactive page 190 during the viewing session, the optimization subsystem 120 regenerates portions of the interactive page 190 based on the model parameters and the new user interactions. Consequently, the interactive page 190 that the optimization subsystem 120 displays changes over time. For explanatory purposes only, multiple snapshots of the interactive page 190 are denoted with parenthetical numbers identifying the chronological order of the snapshot where needed.

In operation, the page build engine 140 generates the initial interactive page 190(1) based on the model parameters and the historical user data that is associated with the user. The optimization subsystem 120 then displays the interactive page 190(1). As the user interacts with the displayed interactive page 190(1), the optimization engine 150 regenerates rows that are included in the interactive page 190(1) based on the new user interactions with the interactive page 190(1). The optimization subsystem 120 then displays the regenerated interactive page 190(2) instead of the interactive page 190(1). As the user continues to interact with the displayed interactive page 190($i$), the optimization engine 150 continues to regenerate rows included in the interactive page 190($i$). After the optimization engine 150 regenerates the rows, the optimization subsystem 120 displays the regenerated interactive page 190($i$+1) instead of the interactive page 190($i$).

In general, the optimization engine 150 regenerates the rows included in the interactive page 190($i$) based on the operations performed by the user during the current viewing session. The operations performed by the user during the current viewing session are referred to herein as the "current session interaction data" (not shown in FIG. 1). The current session interaction data includes operations executed by the user on the displayed interactive page 190($i$) and any number of the previously displayed interactive pages 190($i$–1) through 190(1). Further, the current session interaction data may include information regarding operations that are not executed by the user. For example, the current session interaction data could indicate that the user ignored all of the rows included in the visible portion of the interactive pages 190(1) and 190(3).

The optimization engine 150 may regenerate any number of the "unseen" rows included in the interactive page 190($i$) in any technically feasible fashion based on the current session interaction data. As referred to herein, an "unseen" row is a row that is included in the interactive page 190, but that the optimization subsystem 120 has not previously displayed during the viewing session. By contrast, a "seen" row is a row that is included in the interactive page 190 and is or has been included in the visible portion of the interactive page 190 that is displayed to the user via the display window. Notably, to preserve the continuity of the viewing experience for the user, the optimization engine 150 does not regenerate any of the seen rows.

As a general matter, the optimization engine 150 regenerates the unseen rows to optimize a likelihood that the user selects a video asset for playback. More specifically, for each of the unseen rows included in the interactive page 190, the optimization engine 150 computes the playback likelihood based on current session interaction data and the model parameters. The optimization engine 150 then regenerates the unseen rows in an order of decreasing playback likelihood from the top of the interactive page 190 to the bottom of the interactive page 190. Because the optimization engine 150 continually regenerates rows based on the current session interaction data, the interactive page 190 reflects the viewing session-specific interests of the user. Consequently, the likelihood that the user selects a video asset for playback via the dynamically regenerated interactive page 190 is greater than the likelihood that the user would select a video asset for playback from an interactive page that does not change during the interactive session.

Notably, the optimization engine 150 optimizes the likelihood that a user selects a video asset for playback during the current interactive session irrespective of the amount or quality of historical user data associated with the user. For instance, in some embodiments, because there is no historical user data associated with a new user, the page build engine 140 generates the initial interactive page 190(1) for a new user in a user-agnostic manner. However, during the interactive session, the optimization engine 150 regenerates rows based on the current session interaction data. Consequently, the likelihood that the new user selects a video asset for playback via the dynamically regenerated interactive page 190 is greater than the likelihood that the new user would select a video asset for playback from an interactive page that does not change during the interactive session Note that the techniques described herein are illustrative rather than restrictive, and may be altered without departing from the broader spirit and scope of the invention. In particular, the functionality provided by the optimization subsystem 120, the training engine 130, the page build engine 140, and the optimization engine 150 may be implemented in any number of software applications in any combination. Each of the software applications may execute on any instruction execution system and may be stored in any memory. For example, in some embodiments, the page build engine 140 may execute on a processor that is included in a client device, while the optimization engine 150 may execute on a processor that is included in a server. In other embodiments, the functionality provided by the optimization subsystem 120 during an interactive session may be implemented in any number of client-side applications, while the remaining functionality may be implemented in any number of server-side applications. Further, in various embodiments, any number of the techniques disclosed herein may be implemented while other techniques may be omitted in any technically feasible fashion.

Many modifications and variations on the functionality provided by the optimization subsystem 120, the training engine 130, the page build engine 140, and the optimization engine 150 will be apparent to those of ordinary skill in the art without departing from the scope and spirit of the described embodiments. For instance, in alternate embodiments, the optimization engine 150 may regenerate unseen rows to mitigate impression fatigue. In impression fatigue, as the number of times that a user receives information associated with a particular video asset increases, the likelihood that the user selects and plays the video asset decreases. In some embodiments, the optimization subsystem 120 may regenerate items within rows in addition to or instead of regenerating rows.

Alternate embodiments include any system that is configured to interactively optimize any number and type of display widgets that include any number of type of items based on model parameters and interactions with the display widgets at any level of granularity. For instance, in some embodiments, the computer instances 110 included in the cloud 102 may be configured to implement applications that provide shopping services for physical assets instead of applications that deliver both video and audio streams. In such embodiments, the optimization engine 150 may compute selection likelihoods associated with the physical assets. Subsequently, the optimization engine 150 may regenerate a shopping interactive page to include information regarding physical assets with relatively high selection likelihoods at locations (horizontal and/or vertical) within the shopping interactive page that are associated with relatively high visibility.

In other embodiments, the optimization engine 150 may regenerate search results within a search interactive page based on interactions with the search interactive page while the user is performing searches. In yet other embodiments, the optimization subsystem 120 may optimize an application display interface that is distributed between various display widgets based on interaction data that reflects the interactions of the user with any number of the display widgets in any combination.

Figure 2:
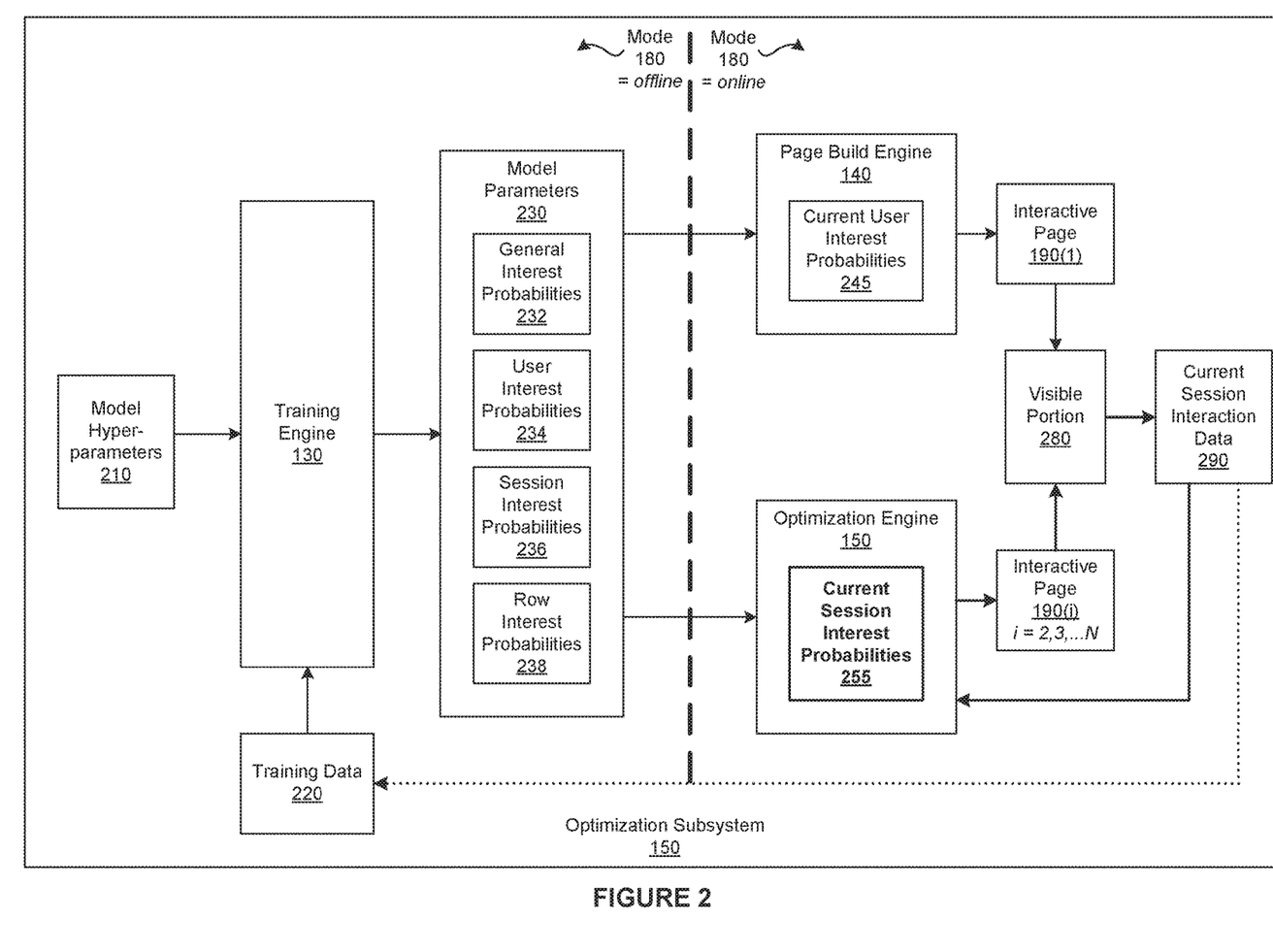
FIG. 2 is a more detailed illustration of the optimization subsystem of FIG. 1, according to various embodiments of the present invention.

FIG. 2 is a more detailed illustration of the optimization subsystem 120 of FIG. 1, according to various embodiments of the present invention. As shown, the optimization subsystem 120 includes, without limitation, model hyperparameters 210, training data 220, the training engine 130, model parameters 230, the page build engine 140, the interactive page 190, a visible portion 280, the optimization engine 150, and current session interaction data 290.

First, in the mode 180 "offline," the training engine 130 executes machine learning operations that optimize the performance of the probabilistic graphical user model implemented in the optimization subsystem 120. More specifically, the training engine 130 optimizes the model parameters 230 based on the training data 220. The training data 220 may include any amount and type of user data associated with any number of users and any number of viewing sessions. As part of optimizing the model parameters 230, the training engine 130 generates a set of interests across the training data 220. Each of the interests is not directly observable (i.e., is latent).

The hyperparameters 210 configure the training engine 130. In addition to a value that defines the total number of interests that the training engine 210 includes in the set of interests, the hyperparameters 210 may include any number of regularization values. As persons skilled in the art will recognize, the regularization values generalize the performance of the model for "non-training" data. In alternate embodiments, the hyperparameters 210 may include any number and type of values.

As shown, the model parameters 230 include, without limitation, general interest parameters 232, user interest probabilities 234, session interest probabilities 236, and row interest probabilities 238. The general interest parameters 232, the user interest probabilities 234, the session interest probabilities 236, and the row interest probabilities 238 comprise probability distributions over the set of interests. In alternate embodiments, the model parameters 230 may include any number and type of model parameters 230 at any level of granularity.

The general interest parameters 232 comprise a probability distribution over the set of interests that is applicable to all the users. Each of the user interest probabilities 234 comprise a probability distribution over the set of interests that is specific to a particular user. Each of the session interest probabilities 236 comprise a probability distribution over the set of interests that is specific to a particular viewing session. Each of the row interest probabilities 236 comprise a probability distribution over the set of interests that is specific to a particular row.

Subsequently, when the mode 180 is equal to "online" and a current user initiates a current viewing session, the page build engine 240 generates the interactive page 190(1) based on the current user data. As referred to herein, the "current user data" includes any amount and type of user data that is associated with the current user. As shown, the page build engine 140 includes, without limitation, current user interest probabilities 245. The current user interest probabilities 245 comprise a probability distribution for the current user over the set of interests.

The page build engine 140 computes the current user interest probabilities 245 based on the current user data and the model parameters 132. Subsequently, for each of the rows included in the interactive page 190, the page build engine 140 computes a playback likelihood based on the current user interest probabilities 245, the general interest probabilities 232, and the row interest probabilities 238 associated with the row. Finally, the page build engine 140 generates the rows included in the interactive page 190(1) based on the playback likelihoods. The page build engine 140 may generate the rows in any technically feasible fashion that increases the likelihood that the user selects a video asset. For example, the page build engine 140 could generate the rows in the interactive page 190(1) in an order of decreasing playback likelihood relative to the top of the interactive page 190(1).

After the page build engine 140 generates the interactive page 190(1), the optimization subsystem 120 sets the current session interest probabilities 255 equal to the current user interest probabilities 245. The current session interest probabilities 255 comprise a probability distribution for the current viewing session over the set of interests relative to the current user interest probabilities 245. The optimization subsystem 120 then displays the visible portion 280 of the interactive page 190(1) to the current user via the consumer device. In general, the visible portion 280 of the interactive page 190 is commensurate with any type of display window or display device that is associated with the current viewing session and the consumer device. As the current user interacts with the interactive page 190(1), the optimization subsystem 120 stores interaction data as the current session interaction data 290 and transmits the current session interaction data 290 to the optimization engine 150.

Regenerating Rows During a Current Viewing Session

The optimization engine 150 receives the current session interaction data 290 and computes the current session interest probabilities 255. In operation, the optimization engine 150 computes the current session interest probabilities 255 based on the current session interaction data 290, the current user interest probabilities 245, and the model parameters 230. Subsequently, for each unseen row included in the interactive page 190(1), the optimization engine 150 computes a playback likelihood. The optimization engine 150 computes the playback likelihood for an unseen row based on the current session interest probabilities 255, the current user interest probabilities 245, the general interest probabilities 232, and the row interest probabilities 238 associated with the unseen row.

The optimization engine 150 then regenerates the unseen rows included in the interactive page 190(1) based on the playback likelihoods to generate the interactive page 190(2). Notably, to ensure a consistent viewing experience, the optimization engine 150 does not regenerate any of the "seen" rows that have been displayed during the current viewing session. The optimization engine 150 may regenerate the unseen rows in any technically feasible fashion that increases the likelihood that the user selects a video asset for playback. For example, the optimization engine 150 could generate the unseen rows in the interactive page 190(2) in an order of decreasing playback likelihood relative to the top of the unseen rows. In alternate embodiments, the optimization engine 140 may also regenerate the information provided within any number of the unseen rows. For example, the optimization engine could regenerate information about video assets included in a given unseen row based on a horizontal order of decreasing playback likelihood relative to the left of the unseen row.

After the optimization engine 150 generates the interactive page 190(2), the optimization subsystem 120 displays the visible portion 280 of the interactive page 190(2) instead of the interactive page 190(1) to the current user via the consumer device. As the current user interacts with the interactive page 190(2), the optimization subsystem 120 includes the new interaction data in the current session interaction data 290 and transmits the current session interaction data 290 to the optimization engine 150. In general, upon receiving new current session interaction data 290, the optimization engine 150 recomputes the current session interest probabilities 255. The optimization engine 150 then regenerates unseen rows included in the current interactive page 190(i) based on the recomputed current session interest probabilities to generate a regenerated interactive page 190 (i+1). Accordingly, the interactive page 190 reflects the operations performed by the current user in real-time and, consequently, the likelihood that the current user selects a video asset for playback is optimized.

As depicted with a dotted line, after the user terminates the current viewing session, the optimization subsystem 120 adds the current session interaction data 290 to the training data 220. Subsequently, when the mode 180 is equal to "offline," the training engine 130 performs machine learning operations that generate new model parameters 230 based on the training data 220, including the current session interaction data 290. In this fashion, the training engine 130 is configured to repeatedly optimize the model parameters 230.

As a general matter, the training engine 130, the page build engine 140, and the optimization engine 150 may implement any number and type of machine learning operations and/or inference operations to optimize the interactive page 190. For instance, in some embodiments, the training engine 130, the page build engine 140, and/or the optimization engine 150 implement one or more of Expectation Maximization techniques, an inner product recommender, a factorization machine, a neural network, a decision tree, and a submodular function.

Figure 3:
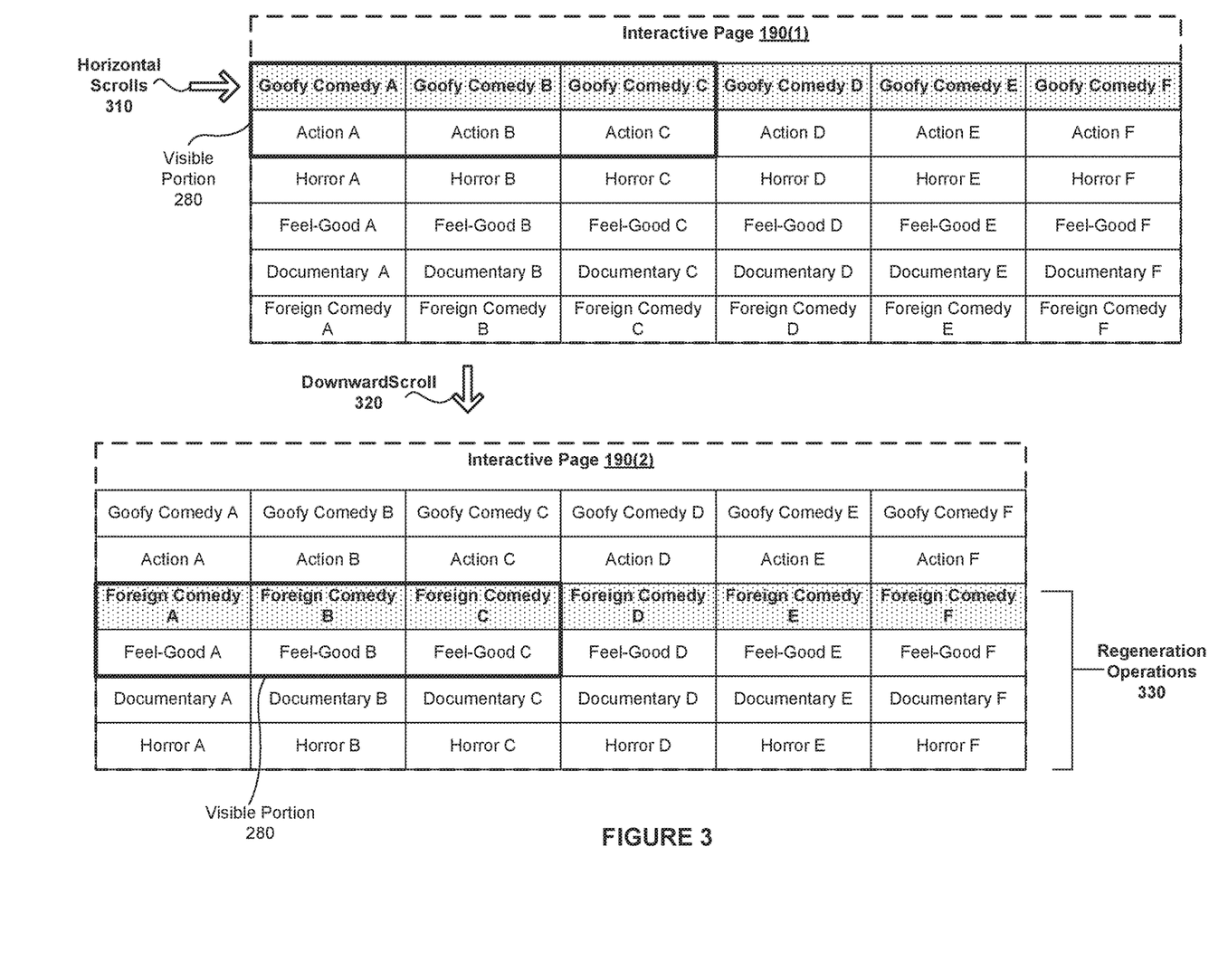
FIG. 3 is an exemplary illustration of regeneration operations performed by the optimization engine of FIG. 2, according to various embodiments of the present invention.

FIG. 3 is an exemplary illustration of regeneration operations 330 performed by the optimization engine 150 of FIG. 2, according to various embodiments of the present invention. For explanatory purposes only, the interactive page 190 includes six rows and six columns, and the visible portion 280 include two rows and three columns. In alternate embodiments, the interactive page 190 and the visible portion 280 may include any number of rows and columns.

As part of initiating a current viewing session for a current user, the optimization subsystem 120 transmits current user data to the page build engine 140. In response, the page build engine 140 computes the current user interest probabilities 245. For each of the rows, the page build engine 140 then computes a playback likelihood based on the current user interest probabilities 245, the general interest probabilities 232, and the row interest probabilities 238 associated with the row. The page build engine 140 generates the rows based on the playback likelihoods to generate the interactive page 190(1).

For explanatory purposes only, the page build engine 140 generates the rows in an order of decreasing playback likelihood from the top of the interactive page 190(1) to the bottom of the interactive page 190(1). As shown, the interactive page 190(1) includes, from top to bottom, a "goofy comedy" row, an "action" row, a "horror" row, a "feel-good" row, a "documentary" row, and a "foreign comedy" row. The visible portion 280 of the interactive page 190(1) enables the user to view information associated with "goofy comedy A," "goofy comedy B," "goofy comedy C," "action A," "action B," and "action C."

The current user performs horizontal scrolls 310 on the top "goofy comedy" row included in the visible portion 280 of the interactive page 190(1). By contrast, the current user does not perform any operations on the second "action" row that is included in visible portion 280 of the interactive page 190(1). The current user then performs a downward scroll 320. The optimization subsystem 150 includes the horizontal scrolls 310 and the downward scroll 320 in the current session interaction data 290. Consequently, the current session interaction data 290 indicates that the user likely has more interest in the "goofy comedy" row in the "action" row.

Upon receiving the current session interaction data 290, the optimization engine 150 computes the current session interest probabilities 255 based on the current session interaction data 290, the current user interest probabilities 245, and the model parameters 230. For each unseen row, the optimization engine 150 then computes the playback likelihood based on the current session interest probabilities 255, the current user interest probabilities 245, the general interest probabilities 232, and the row interest probabilities 238 associated with the unseen row.

For instance, for the "documentary" row, the optimization engine 150 computes the playback likelihood based on the current session interest probabilities 255, the current user interest probabilities 245, the general interest probabilities 232, and the row interest probabilities 238 associated with the "documentary" row. In alternate embodiments, the optimization engine 150 may compute the playback likelihoods in any technically feasible fashion that is based on the current session interest probabilities 255.

The unseen rows are the "horror," "feel-good," "documentary," and "foreign comedy" rows. To generate the interactive page 190(2), the optimization engine 150 performs the regeneration operations 330 that regenerate the unseen rows included in the interactive page 190(1). More specifically, the optimization engine 150 regenerates the unseen rows in an order of decreasing playback likelihood from the top of the interactive page 190(2) to the bottom of the interactive page 190(2). As shown, because the current session interaction data 290 indicates that the current user has more interest in the "goofy comedy" row than the "action" row, the optimization engine 150 performs the regeneration operations 330 that generate the "foreign comedy" row as the third row in the interactive page 190(2). Further, the regeneration operations 330 generate the "feel-good" row as the fourth row, the "documentary" row as the fifth row, and the "horror" row as the final row included in the interactive page 190(2).

The optimization engine 150 then causes the consumer device to display the visible portion 280 of the interactive page 190(2) instead of the visible portion 280 of the interactive page 190(1). As shown, because the current user performed the downward scroll 320, the visible portion 280 of the interactive page 190(2) is shifted downwards relative to the visible portion 280 of the interactive page 190(1). More specifically, the visible portion 280 of the interactive page 190(2) enables the current user to view information associated with "foreign comedy A," "foreign comedy B," "foreign comedy C," "feel-good A," "feel-good B," and "feel-good C."

Advantageously, by regenerating the unseen rows, the optimization engine 150 increases the efficiency with which the current user is able to locate information on video assets that are closely related to the video assets in the "goofy comedy" row. As a general matter, by regenerating items included in the interactive page 190(i) in real-time based on the interactions of the current user with the previous interactive pages 190(i−1) through 190(1), the optimization engine 150 reduces the time required for the user to view information associated with an item that arouses an interest.

Figure 4:
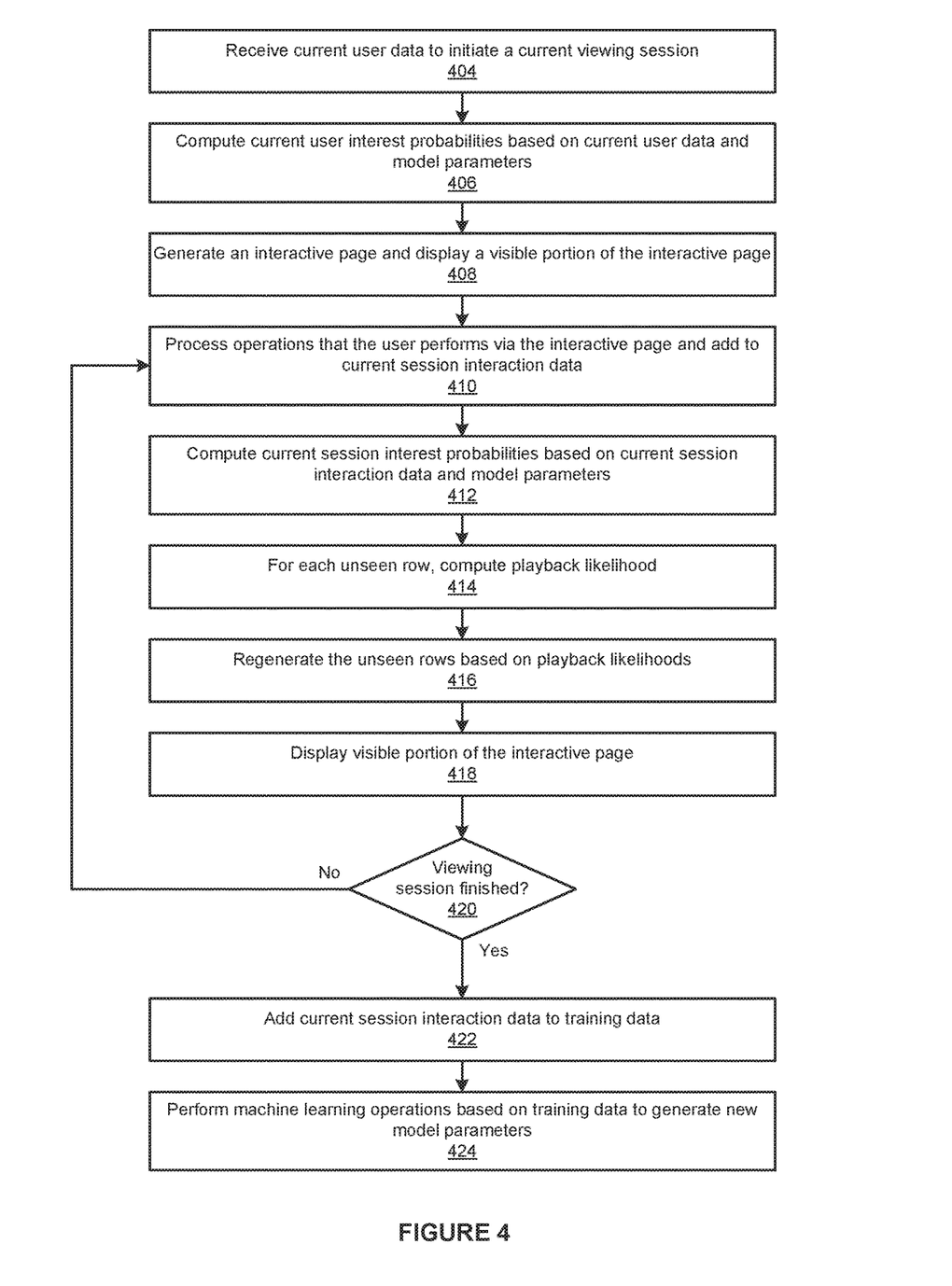
FIG. 4 is a flow diagram of method steps for generating an interactive page during a current viewing session, according to various embodiments of the present invention.

FIG. 4 is a flow diagram of method steps for or generating an interactive page during a current viewing session, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 404, where the optimization subsystem 120 operates in the mode 180 "online" and transmits current user data to the page build engine 140 to initiate a current viewing session for the current user. The current user data may include any number and type of data that enables the page build engine 140 to personalize the current viewing session. For example, the current user data could comprise a user name, interaction data associated with previous viewing sessions, implicit preferences, and/or explicit preferences. At step 406, the page build engine 140 computes the current user interest probabilities 245 based on the current user data and the model parameters 230.

As described previously herein, the general interest probabilities 232, the user interest probabilities 234, the session interest probabilities 236, and the row interest probabilities 238 included in the model parameters 230 comprise probability distributions over a set of interests. The training engine 130 determines the set of interests during the machine learning operations that generate the model parameters 230 based on the training data 220. In a complementary fashion, the current user interest probabilities 245 comprise a probability distribution for the current user over the set of interests.

At step 408, the page build engine 140 generates the first interactive page 190(1), displays the visible portion 280 of the first interactive page 190(1), and sets the current interactive page 190 equal to the first interactive page 190(1). More precisely, the page build engine 140 generates the interactive page 190(1) based on the current user interest probabilities 245, the general interest probabilities 232, and the row interest probabilities 238. As persons skilled in the art will recognize, the visible portion 280 is commensurate with any type of display window or display device that is associated with the viewing session. At step 410, the optimization subsystem 150 processes one or more operations that the user performs via the current interactive page 190 and adds information associated with the operations to the current session interaction data 290.

At step 412, the optimization engine 150 computes the current session interest probabilities 255 based on the current session interaction data 290 and the model parameters 230. As described previously herein, the current session interest probabilities 255 comprise a probability distribution for the current viewing session over the set of interests relative to the current user interest probabilities 245. At step 414, for each "unseen" row, the optimization engine 150 computes a playback likelihood based on the current session interest probabilities 255, the current user interest probabilities 245, the general interest probabilities 232, and the row interest probabilities 238 associated with the unseen row. In alternate embodiments, the optimization engine 150 may compute the playback likelihoods in any technically feasible fashion.

At step 416, the optimization engine 150 regenerates any number of the unseen rows that are included in the current interactive page 190 based on the playback likelihoods to generate a new interactive page 190. Notably, to ensure a consistent viewing experience, the optimization engine 150 does not regenerate any of the "seen" rows that have been displayed during the viewing session. The optimization engine 150 may regenerate the unseen rows in any technically feasible fashion that increases the likelihood that the user selects a video asset for playback. For example, the optimization engine 150 could generate the unseen rows in the new interactive page 190 in an order of decreasing playback likelihood relative to the top of the unseen rows.

At step 418, the optimization engine 150 displays the visible portion 280 of the new interactive page 190 and sets the current interactive page 190 equal to the new interactive page 190. At step 420, the optimization engine 150 determines whether the current viewing session is finished. If, at step 420, the optimization engine 150 determines that the current viewing session is not finished, then the method 400 returns to step 410, where the optimization engine 150 regenerates the unseen rows based on additional operations that the user performs via the current interactive page 190.

If, however, at step 420, the optimization engine 150 determines that the current viewing session is finished, then the method 400 proceeds to step 422. At step 422, the optimization subsystem 120 adds the current session interaction data 290 to the training data 220. At step 422, the optimization subsystem 150 operates in the mode 180 "offline," and the training engine 130 performs machine learning operations that generate new model parameters 230 based on the training data 220, including the current session interaction data 290. Because the optimization subsystem 150 optimizes the model parameters 290 based on the current viewing session, subsequent viewing sessions executed by any number of users benefit from the corresponding, improved probabilistic graphical user model.

In sum, the disclosed techniques may be used to display video assets as part of a video asset distribution system. An optimization subsystem includes a training engine, a page build engine, and an optimization engine. The training engine generates a set of interests and model parameters based on training data (e.g., scrolls, clicks, explicitly specified preferences, rankings, etc.). When a current user initiates a current viewing session, the page build engine computes a probability distribution for the current user over the set of interests based on current user data and the model parameters. The page build engine then generates the rows included in an interactive page of available video assets based on the probability distribution associated with the current user and probability distributions associated with each of the rows.

As the user interacts with the interactive page, the optimization engine computes the probability distribution for the current viewing session based on the user interactions, the probability distribution associated with the current user, and the model parameters. The optimization engine then regenerates the unseen rows based on the probability distribution associated with the current viewing session and the probability distributions associated with each of the unseen rows. As referred to herein, the "unseen" rows are the rows that have not been displayed to the current user during the current viewing session. The optimization engine may recompute the probability distribution associated with the current viewing session and regenerate the unseen rows any number of times during the current viewing session.

Advantageously, by regenerating the unseen rows, the optimization engine increases the likelihood that the current user selects a video asset for playback. More specifically, because the optimization engine performs regeneration operations based on the user interactions during the current viewing session, as the current user scrolls downward through the rows, newly displayed rows reflect the viewing session-specific interests of the current user. By contrast, because a conventionally generated interactive page is not changed during the session, the interactive page does not necessarily correlate to the interests of the current user during the current viewing session.

1. In some embodiments, a method comprises displaying a first portion of an interactive page during a viewing session, wherein the first portion of the interactive page includes a first set of items; computing a probability distribution for the viewing session over a set of interests based on one or more model parameters and one or more operations performed by a first user within the interactive page during the viewing session; regenerating a second portion of the interactive page based on the probability distribution for the viewing session and the one or more model parameters, wherein the second portion of the interactive page includes a second set of items that were not included in the first portion of the interactive page; and displaying at least a part of the second portion of the interactive page.

2. The method of clause 1, wherein the second set of items includes a first item and a second item, the one or more model parameters include a first item probability distribution for the first item over the set of interests and a second item probability distribution for the second item over the set of interests, and regenerating the second portion of the interactive page comprises computing a first selection likelihood based on the probability distribution for the interactive session and the first item probability distribution; computing a second selection likelihood based on the probability distribution for the interactive session and the second item probability distribution; and if the first selection likelihood is higher than the second selection likelihood, then including the first item at a first location within the second portion of the interactive page and the second item at a second location within the second portion of the interactive page, wherein the first location is associated with a higher visibility than the second location; or if the first selection likelihood is not higher than the second selection likelihood, then including the second item at the first location and the first item at the second location.

3. The method of clauses 1 or 2, wherein each item included in the second set of items comprises information about a video asset or a row of information about a plurality of video assets.

4. The method of any of clauses 1-3, wherein the one or more operations performed by the first user include at least one of a horizontal scrolling operation, a vertical scrolling operation, and a selection operation.

5. The method of any of clauses 1-4, further comprising, prior to displaying the first portion of the interactive page computing a probability distribution for the first user over the set of interests based on the one or more model parameters and user data that is associated with the first user; and generating the interactive page based on the probability distribution for the first user.

6. The method of any of clauses 1-5, further comprising, prior to initiating the first viewing session, setting the probability distribution for the viewing session equal to the probability distribution for the first user.

7. The method of any of clauses 1-6, further comprising adding the one or more operations performed by the first user to a set of training data; performing one or more machine learning operations based on the set of training data to generate one or more new model parameters that are included in a new model that maps user data to selection likelihoods; and generating a new interactive page based on the one or more new model parameters and user data that is associated with a second user.

8. The method of any of clauses 1-7, wherein the probability distribution for the viewing session is generated from an expectation-maximization algorithm.

9. In some embodiments, a computer-implemented computer-readable storage medium includes instructions that, when executed by a processor, cause the processor to perform the steps of displaying a first portion of an interactive page during a viewing session, wherein the first portion of the interactive page includes a first set of items; computing a probability distribution for the viewing session over a set of interests based on a probabilistic graphical user model and one or more operations performed by a first user within the interactive page during the viewing session; for each item included in a second set of items that are included in the interactive page but were not included in the first portion of the interactive page, computing a selection likelihood based on the probability distribution for the viewing session and the probabilistic graphical user model; and regenerating a second portion of the interactive page for display during the viewing session based on the selection likelihoods.

10. The computer-readable storage medium of clause 9, wherein the second portion of the interactive page includes a first item and a second item, and regenerating the second portion of the interactive page comprises if a first selection likelihood that is associated with the first item is higher than a second selection likelihood that is associated with the second selection, then including the first item at a first location within the second portion of the interactive page and the second item at a second location within the second portion of the interactive page, wherein the first location is associated with a higher visibility than the second location; or if the first selection likelihood is not higher than the second selection likelihood, then including the second item at the first location and the first item at the second location.

11. The computer-readable storage medium of clauses 9 or 10, wherein each item included in the second set of items comprises information about a video asset or a row of information about a plurality of video assets.

12. The computer-readable storage medium of any of clauses 9-11, wherein the one or more operations performed by the first user include at least one of a horizontal scrolling operation, a vertical scrolling operation, and a selection operation.

13. The computer-readable storage medium of any of clauses 9-12, further comprising, prior to displaying the first portion of the interactive page computing a probability distribution for the first user over the set of interests based on the probabilistic graphical user model and user data that is associated with the first user; and generating the interactive page based on the probability distribution for the first user.

14. The computer-readable storage medium of any of clauses 9-13, further comprising, prior to initiating the first viewing session, setting the probability distribution for the viewing session equal to the probability distribution for the first user.

15. The computer-readable storage medium of any of clauses 9-14, further comprising performing one or more machine learning operations on an untrained probabilistic graphical user model to generate the set of interests and one or more model parameters that are included in the probabilistic graphical user model.

16. The computer-readable storage medium of any of clauses 9-15, wherein the probability distribution for the viewing session is generated from an expectation-maximization algorithm.

17. In some embodiments, a system comprises a memory storing instructions associated with a optimization engine; and a processor that is coupled to the memory and, when executing the instructions, is configured to compute a probability distribution for a viewing session over a set of interests based on a probabilistic graphical user model and one or more operations performed by a first user within an interactive page during the viewing session; select a first set of items that are included in the interactive page but have not been displayed during the viewing session; and regenerate a portion of the interactive page based on the probability distribution for the viewing session and the one or more model parameters, wherein the portion of the interactive page includes a set of items that are included in the interactive page but have not been displayed during the viewing session.

18. The system of clause 17, wherein each item included in the set of items comprises information about a video asset or a row of information about a plurality of video assets.

19. The system of clauses 17 or 18, wherein the one or more operations performed by the first user include at least one of a horizontal scrolling operation, a vertical scrolling operation, and a selection operation.

20. The system of any of clauses 17-19, wherein the probability distribution for the viewing session is generated from an expectation-maximization algorithm.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    displaying a first portion of an interactive page during a current viewing session, wherein the first portion of the interactive page includes a first set of items;
    computing a first probability distribution based on first data associated with one or more previous viewing sessions, wherein the first data comprises information on one or more operations performed by a first user during the one or more previous viewing sessions, and wherein computing the first probability distribution comprises performing one or more machine learning operations to determine one or more parameters of a model, the one or more parameters including the first probability distribution;
    computing a second probability distribution based on second data associated with the current viewing session and the one or more parameters of the model, wherein the second data comprises information on one or more operations performed by the first user within the interactive page during the current viewing session;
    regenerating a second portion of the interactive page by:
    computing, based on the first probability distribution and the second probability distribution, a respective selection likelihood for each item included in a second set of items that have not been displayed during the current viewing session, and
    regenerating the second portion of the interactive page based on the respective selection likelihoods; and
    displaying, during the current viewing session and subsequent to regenerating the second portion of the interactive page, at least a part of the second portion of the interactive page and at least a part of the first portion of the inter active page.

2. The computer-implemented method of claim 1, wherein the second set of items includes a first item and a second item, the second probability distribution is further computed based on one or more model parameters that include a first item probability distribution for the first item over the set of interests and a second item probability distribution for the second item over the set of interests, and regenerating the second portion of the interactive page comprises:
    computing a first selection likelihood based on the first probability distribution and the first item probability distribution;
    computing a second selection likelihood based on the first probability distribution and the second item probability distribution; and
    if the first selection likelihood is higher than the second selection likelihood, then including the first item at a first location within the second portion of the interactive page and the second item at a second location within the second portion of the interactive page, wherein the first location is associated with a higher visibility than the second location; or
    if the first selection likelihood is not higher than the second selection likelihood, then including the second item at the first location and the first item at the second location.

3. The computer-implemented method of claim 1, wherein each item included in the second set of items comprises information about a video asset or a row of information about a plurality of video assets.

4. The computer-implemented method of claim 1, wherein the one or more operations performed by the first user include at least one of a horizontal scrolling operation or a vertical scrolling operation.

5. The computer-implemented method of claim 1, further comprising, prior to displaying the first portion of the interactive page:
    computing a probability distribution for the first user over the first set of items based on one or more model parameters and user data that is associated with the first user; and
    generating the interactive page based on the probability distribution for the first user over the first set of items.

6. The computer-implemented method of claim 5, further comprising, prior to initiating the current viewing session, setting a probability distribution for the current viewing session equal to a probability distribution for the first user.

7. The computer-implemented method of claim 5, further comprising:
    adding the one or more operations performed by the first user to a set of training data;
    performing one or more machine learning operations based on the set of training data to generate one or more new model parameters that are included in a new machine learning model; and
    generating a new interactive page based on the new machine learning model and user data that is associated with a second user.

8. The computer-implemented method of claim 1, wherein the second probability distribution is computed via an expectation-maximization algorithm.

9. The computer-implemented method of claim 1, wherein the first probability distribution is associated with interests of the first user, interests of a plurality of users, or a row of items.

10. The computer-implemented method of claim 1, wherein the model comprises a probabilistic graphical user model.

11. A non-transitory computer-readable storage medium including instructions that, when executed by a processor, cause the processor to perform the steps of:
    displaying a first portion of an interactive page during a current viewing session, wherein the first portion of the interactive page includes a first set of items;
    computing a first probability distribution based on first data associated with one or more previous viewing sessions, wherein the first data comprises information on one or more operations performed by a first user during the one or more previous viewing sessions, and wherein computing the first probability distribution comprises performing one or more machine learning operations to determine one or more parameters of a model, the one or more parameters including the first probability distribution;
    computing a second probability distribution based on second data associated with the current viewing session and the one or more parameters of the model, wherein the second data comprises information on one or more operations performed by the first user within the interactive page during the current viewing session;

regenerating a second portion of the interactive page by:
computing, based on the first probability distribution and the second probability distribution, a respective selection likelihood for each item included in a second set of items that have not been displayed during the current viewing session, and regenerating the second portion of the interactive page based on the respective selection likelihoods; and displaying, during the current viewing session and subsequent to regenerating the second portion of the interactive page, at least a part of the second portion of the interactive page and at least a part of the first portion of the interactive page.

12. The non-transitory computer-readable storage medium of claim 11, wherein the second portion of the interactive page includes a first item and a second item, and regenerating the second portion of the interactive page comprises:

if a first selection likelihood that is associated with the first item is higher than a second selection likelihood that is associated with the second item, then including the first item at a first location within the second portion of the interactive page and the second item at a second location within the second portion of the interactive page, wherein the first location is associated with a higher visibility than the second location, wherein the first selection likelihood and the second selection likelihood are computed based on the first probability distribution and the second probability distribution; or if the first selection likelihood is not higher than the second selection likelihood, then including the second item at the first location and the first item at the second location.

13. The non-transitory computer-readable storage medium of claim 11, wherein each item included in the second set of items comprises information about a video asset or a row of information about a plurality of video assets.

14. The non-transitory computer-readable storage medium of claim 11, wherein the one or more operations performed by the first user include at least one of a horizontal scrolling operation or a vertical scrolling operation.

15. The non-transitory computer-readable storage medium of claim 11, the steps further comprising, prior to displaying the first portion of the interactive page:

computing a probability distribution for the first user over the first set of items based on one or more model parameters and user data that is associated with the first user; and generating the interactive page based on the probability distribution for the first user over the first set of items.

16. The non-transitory computer-readable storage medium of claim 15, the steps further comprising, prior to initiating the first viewing session, setting a probability distribution for the viewing session equal to a probability distribution for the first user.

17. The non-transitory computer-readable storage medium of claim 11, the steps further comprising performing one or more machine learning operations on an untrained machine learning model to generate the set of interests and one or more model parameters that are included in a trained machine learning model.

18. The non-transitory computer-readable storage medium of claim 11, wherein the second probability distribution is computed via an expectation- maximization algorithm.

19. A system comprising:

a memory storing instructions associated with an optimization engine; and a processor that is coupled to the memory and, when executing the instructions, is configured to:

compute a first probability distribution based on first data associated with one or more previous viewing sessions, wherein the first data comprises information on one or more operations performed by a first user during the one or more previous viewing sessions, and wherein computing the first probability distribution comprises performing one or more machine learning operations to determine one or more parameters of a model, the one or more parameters including the first probability distribution, compute a second probability distribution based on second data associated with the current viewing session and the one or more parameters of the model, wherein the second data comprises information on one or more operations performed by the first user within the interactive page during the current viewing session, regenerate a second portion of the interactive page by:

computing, based on the first probability distribution and the second probability, a respective selection likelihood for each item included in a second set of items that have not been displayed during the current viewing session; and regenerating the second portion of the interactive page based on the respective selection likelihoods, and display, during the current viewing session and subsequent to regenerating the first portion of the interactive page, at least a part of the first portion of the interactive page and at least a part of a second portion of the interactive page.

20. The system of claim 19, wherein each item included in the set of items comprises information about a video asset or a row of information about a plurality of video assets.

21. The system of claim 19, wherein the one or more operations performed by the first user include at least one of a horizontal scrolling operation or a vertical scrolling operation.

22. The system of claim 19, wherein the second probability distribution is computed via an expectation-maximization algorithm.

* * * * *

UNITED STATES PATENT AND TRADEMARK OFFICE
CERTIFICATE OF CORRECTION

PATENT NO. : 12,314,537 B2
APPLICATION NO. : 15/380124
DATED : May 27, 2025
INVENTOR(S) : Christopher V. Alvino et al.

Page 1 of 1

It is certified that error appears in the above-identified patent and that said Letters Patent is hereby corrected as shown below:

On the Title Page

Page 2, Column 2, Line 50, (56) References Cited:
Please delete "3. Rendle. Factorization Machines with libFM. Trans. Intell. Syst. Technol., 3(3), pp. 57:1-22. ACM, 2012." and insert --S. Rendle. Factorization Machines with libFM. Trans. Intell. Syst. Technol., 3(3), pp. 57:1-22. ACM, 2012.--;

In the Claims

Column 19, Claim 1, Line 45, please delete "inter active" and insert --interactive--.

Signed and Sealed this
Twenty-second Day of July, 2025

Coke Morgan Stewart
*Acting Director of the United States Patent and Trademark Office*